United States Patent [19]

Saitoh et al.

[11] 3,987,149

[45] *Oct. 19, 1976

[54] METHOD FOR REMOVING SULFUR DIOXIDE FROM EXHAUST GAS

[75] Inventors: Shigeru Saitoh; Kenji Kodama; Tamotsu Miyamori; Tetsuya Watanabe; Koji Konno; Kunihide Yaguchi, all of Iwaki, Japan

[73] Assignee: Kureha Kagaku Kogyo Kabushiki Kaisha, Tokyo, Japan

[ * ] Notice: The portion of the term of this patent subsequent to Dec. 23, 1992, has been disclaimed.

[22] Filed: Dec. 24, 1974

[21] Appl. No.: 536,166

[30] Foreign Application Priority Data

Dec. 25, 1973 Japan.................................. 48-3689

[52] U.S. Cl................................ 423/243; 423/166
[51] Int. Cl.².......................................... C01B 17/00
[58] Field of Search ......................... 423/242–243, 423/166, 512, 555, 244

[56] References Cited
UNITED STATES PATENTS

| | | | |
|---|---|---|---|
| 3,632,306 | 1/1972 | Villiers-Fisher et al. | 423/243 |
| 3,840,638 | 10/1974 | Morita et al. | 423/242 |
| 3,928,537 | 12/1975 | Saitoh et al. | 423/243 |

FOREIGN PATENTS OR APPLICATIONS

| | | | |
|---|---|---|---|
| 101,738 | 8/1937 | Australia | 423/243 |
| 443,314 | 2/1936 | United Kingdom | 423/243 |

*Primary Examiner*—Oscar R. Vertiz
*Assistant Examiner*—Gregory A. Heller
*Attorney, Agent, or Firm*—Lane, Aitken, Dunner & Ziems

[57] ABSTRACT

A sulfur dioxide-containing exhaust gas is scrubbed by contact with an aqueous solution containing an alkali salt of an organic acid to dissolve sulfur dioxide in the aqueous solution in the form of alkali sulfite. The alkali sulfite in the solution is converted by oxidation into alkali sulfate, which is contacted for reaction with a calcium compound to form calcium sulfate. The calcium sulfate so formed is separated by filtration from the aqueous solution for recovery while the filtrate is recycled for use as the aqueous solution for scrubbing the exhaust gas. The concentration of alkali sulfite in the scrubbing aqueous solution is maintained at a level of less than 1% to ensure efficient removal of sulfur dioxide from the exhaust gas in the form of calcium sulfate.

5 Claims, 1 Drawing Figure

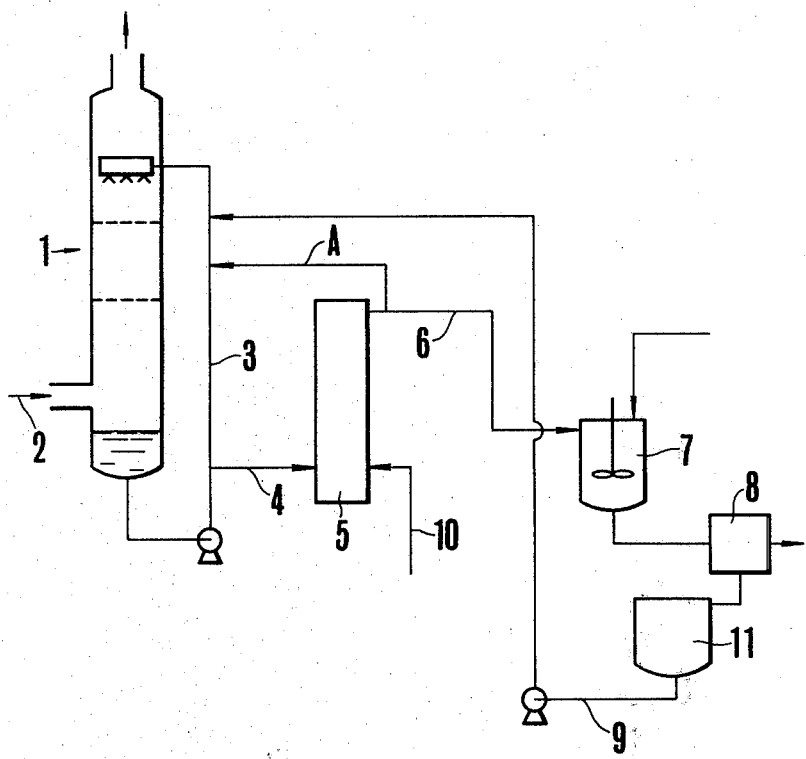

METHOD FOR REMOVING SULFUR DIOXIDE FROM EXHAUST GAS

BACKGROUND OF THE INVENTION

1. Field of the Invention

The present invention relates to a method for removing sulfur dioxide from an exhaust gas and more particularly to a method for removing sulfur dioxide from an exhaust gas in the form of calcium sulfate (gypsum).

2. Description of Prior Art

There have been proposed various methods of removing sulfur dioxide from an exhaust gas, such as an engine exhaust gas, in the form of calcium sulfate. In a typical wet-type process, the exhaust gas is contacted with an alkali sulfite-containing aqueous solution, whereby sulfur dioxide contained in the exhaust gas is absorbed in the aqueous solution to react with the alkali sulfite, producing alkali bisulfite. Slaked lime (calcium hydroxide) or limestone (calcium carbonate) is added to the aqueous alkali bisulfite solution to form calcium sulfite which is then oxidized into calcium sulfate for removal, as shown by reaction formulae (1) through (4) below, where sodium sulfite is the alkali sulfite by way of example.

$$Na_2SO_3 + SO_2 + H_2O \rightarrow 2NaHSO_3 \tag{1}$$

$$2NaHSO_3 + CaCO_3 \rightarrow CaSO_3 + Na_2SO_3 + CO_2 + H_2O \tag{2}$$

alternatively, $$2NaHSO_3 + Ca(OH)_2 \rightarrow CaSO_3 + Na_2SO_3 + 2H_2O \tag{3}$$

$$CaSO_3 + \tfrac{1}{2} O_2 \rightarrow CaSO_4 \tag{4}$$

In an wet process which employs the alkali sulfite-containing aqueous solution to remove sulfur dioxide from the exhaust gas by reaction with alkali sulfite to form bisulfite, part of the alkali sulfite inevitably reacts with oxygen and other gases contained in the exhaust gas and is oxidized into alkali sulfate resulting in a buildup of alkali sulfate in the alkali bisulfite solution. When such a buildup of alkali sulfate takes place to a significant degree, the quantity of alkali sulfite in the alkali sulfite-containing aqueous solution, available for reaction with sulfur dioxide decreases thus reducing the rate of sulfur dioxide absorption, and efficiency. The alkali sulfate, which accumulates as a by-product, is only slightly reactive with slaked lime or limestone which is added to the alkali bisulfite-containing aqueous solution for the purpose of forming calcium sulfite. The alkali sulfate thus, must be removed in advance from the alkali bisulfite solution by a suitable method. To facilitate removal of the alkali sulfate, for example, sulfuric acid and calcium sulfite are introduced into the alkali bisulfite-containing solution from an external source to convert the alkali sulfate into calcium sulfate, as shown by reaction formulae (5) and (6) below, where sodium sulfate is used as the alkali sulfate.

$$H_2SO_4 + CaSO_3 + H_2O \rightarrow CaSO_4 + SO_2 + 2H_2O \tag{5}$$

$$SO_2 + Na_2SO_4 + CaSO_3 + 3H_2O \rightarrow CaSO_4 + 2NaHSO_3 + 2H_2O \tag{6}$$

The introduction of sulfuric acid and calcium sulfite from an external source to the alkali bisulfite-containing aqueous solution adds an undesirable complication to the process.

The present inventors have disclosed in their copending application, U.S. Ser. No. 440,381, filed Feb. 7, 1974 a method for easy removal of sulfur dioxide from exhaust gas which overcomes the aforementioned shortcomings of the prior-art methods and does not reduce in the sulfur dioxide removal efficiency. The method involves contacting a sulfur dioxide-containing exhaust gas with an aqueous solution containing at least one organic acid salt, expressed by the formula RCOOM, wherein R represents, methyl, ethyl or propyl and M represents an alkali metal or $NH_4$. The salt reacts with the sulfur dioxide contained in the gas to form a sulfite. In accordance with the method of U.S. Ser. No. 440,381, the sulfur dioxide-containing exhaust gas is brought into contact with an aqueous solution containing an alkali salt of the acid, and the sulfur dioxide is removed from the exhaust gas by dissolution in the aqueous solution in the form of alkali sulfite. After oxidizing the alkali sulfite to alkali sulfate, a calcium compound such as slaked lime or limestone is brought into contact with the aqueous solution to convert the alkali sulfate into calcium sulfate, which is separated by filtration from the solution in a subsequent recovery step. The remaining liquor or filtrate containing the organic acid salt is recycled for use as the aqueous scrubbing solution. The present inventors have discovered that a small quantity of calcium sulfate remains in the filtrate reacts with alkali sulfite which is produced by contact of the exhaust gas with the filtrate, forming calcium sulfite which is less soluble than calcium sulfate and tends to gradually deposit on the gas-absorber and associated apparatus as scale. The chemical reaction which results in the formation of calcium sulfite is shown by reaction formula (7) below, where sodium sulfite is the alkali sulfite for purposes of illustration.

$$CaSO_4 + Na_2SO_3 \rightarrow CaSO_3 + Na_2SO_4 \tag{7}$$

The formation of scale on the reactor walls will increase the pressure drop in the absorption tower and may result in blockage of auxiliary piping which can cause various trouble during operation, maintenance and management of the plant. There exist various chemical and mechanical methods for the removal of such scale including dissolution or washing by or with chemicals and continuous or periodical mechanical removal by scraping or water under pressure. In the chemical method, it is necessary to either suspend operation of the reactor, at least during the removal, or to use a reserve reaction tower to allow continuous operation, resulting in high operational costs or investment. With mechanical removal, it is difficult to remove the scale to a satisfactory degree especially with a reactor of a large size.

As will be understood from the foregoing description, there exists a need for an efficient method of removing sulfur dioxide from the exhaust gas in the form of calcium sulfate which does not result in formation of scale within the reactor.

SUMMARY OF THE INVENTION:

It is an object of the invention to provide a novel method for removing sulfur dioxide from an exhaust gas in the form of calcium sulfate in a manner precluding formation of scale on the reactor walls.

It has now been discovered that the scale problem can be practically eliminated by controlling the concentration of alkali sulfite in the organic acid salt solution which is used to scrub the exhaust gas as in the method of U.S. application Ser. No. 440,381. Specifically, when the alkali sulfite concentration of the aqueous solution, that is the alkali sulfite concentration in the gas-absorption tower, is less than 2%, the rate of reaction formula (7) will become extremely low and with an alkali sulfite concentration of less than 1%, no scale will be formed on the reactor walls.

According to the method of the present invention, an exhaust gas containing sulfur dioxide is scrubbed by contact with an aqueous solution containing an alkali salt of organic acid to dissolve sulfur dioxide in the form of alkali sulfite. After oxidizing the alkali sulfite to alkali sulfate, the alkale sulfate-containing aqueous solution is brought into contact with a calcium compound to form calcium sulfate. The calcium sulfate is recovered by separation from the solution while the remaining liquor or filtrate is recycled for use as the scrubbing solution. Furthermore, the method is characterized in that the alkali sulfite concentration in the scrubbing solution is maintained at a level of less than 1%.

The above and other objects, features and advantages of the invention will become clear from the following description of the invention and the appended claims, taken in conjunction with the accompanying drawing which shows by way of example, a preferred embodiment of the present invention.

BRIEF DESCRIPTION OF THE DRAWING:

In the accompanying drawing:
The sole FIGURE is a flow chart illustrating a preferred embodiment of the method of the invention for removing sulfur dioxide from an exhaust gas in the form of calcium sulfate.

PARTICULAR DESCRIPTION OF THE INVENTION:

A suitable solution for use in the method of the invention is an aqueous solution which contains one or more ammonium or alkali metal salts of such organic acids as acetic acid, propionic acid, and butyric acid. The concentration of the organic acid or acids in the aqueous solution is not critical but is preferably in the range of 5 to 10%. When an exhaust gas containing sulfur dioxide is brought into contact with an aqueous solution containing an alkali salt of an organic acid of the type just described, sulfur dioxide will react with the alkali salt in the manner indicated by reaction formula (8) below to form an alkali sulfite which remains dissolved in the aqueous solution. In formula (8), RCOO represents an organic acid group and M represents an alkali metal or $NH_4$.

$$2RCOOM + SO_2 + H_2O \rightarrow 2RCOOH + M_2SO_3 \qquad (8)$$

The temperature at which the exhaust gas is scrubbed with the alkali salt of the acid-containing solution is not critical and may be in a range substantially the same as in the conventional wet-type process employing an alkali sulfite-containing aqueous solution, namely, from room temperature up to 90° C.

The alkali sulfite thus obtained is then oxidized to an alkali sulfate, simply by exposing the alkali sulfite-containing solution to oxygen or air. The oxidation reaction should be rapidly effected. By adding ferrous sulfate or other Fe-salt to the aqueous solution in a concentration of 0.04% or greater but within the soluble range, it is possible to accelerate the rate of oxidation. The addition of the Fe-salt to the solution allows a reduction in the size of the oxidation apparatus due to the enhanced oxidation rate, and also decreases the loss of the organic acid in solution which is lost by splashing and/or entrainment in the oxidizing fluid existing the system. The solution additionally contains an alkali bisulfite which is formed as a result of the reaction between sulfur dioxide and the alkali sulfite as expressed by formula (1). The alkali bisulfite in the solution is oxidized to alkali sulfate during the oxidation of alkali sulfite.

In the next step, a calcium compound is brought into contact with the aqueous solution now containing alkali sulfate to form calcium sulfate. An inorganic calcium compound such as calcium carbonate, calcium hydroxide or calcium oxide is used in this step. Instead of an inorganic calcium compound, it is possible to use a calcium salt of an organic acid, of the formula $(RCOO)_2Ca$, such as calcium acetate, calcium propionate, calcium and butyrate. The chemical reactions in the step just described, are expressed by formulae (9) and (10) below, where calcium carbonate is used as an inorganic calcium compound by way of example and an alkali metal or $NH_4$ is represented by M.

$$2RCOOH + CaCO_3 \rightarrow (RCOO)_2Ca + CO_2 + H_2O \qquad (9)$$

$$M_2SO_4 + (RCOO)_2Ca \rightarrow CaSO_4 + 2RCOOM \qquad (10)$$

In the present invention, a mixture of two or more calcium compounds selected from the above-mentioned inorganic calcium compounds and calcium salts of organic acids may be used. When an inorganic compound of calcium is used, desirable results are obtainable by introducing the compound in powder form or in the form of an aqueous slurry.

The calcium sulfate obtained in the previous step is recovered by separation from the reaction solution. The filtrate which remains after separation of the calcium sulfate is an aqueous solution containing an alkali salt of an organic acid (RCOOM) which is suitable for removing sulfur dioxide from the exhaust gas. The filtrate is thus recirculated in the system for repeated use as the scrubbing solution. As previously noted, in the method of the present invention, the alkali sulfite concentration in the scrubbing solution is maintained at a level of less than 1%. For this purpose, the alkali sulfite-containing solution which is formed by contacting the exhaust gas with the scrubbing solution, that is, the entire aqueous solution discharged from the absorption tower may be passed through an oxidation apparatus to sufficiently oxidize the alkali sulfite in the solution before treating same in the manner previously described. Alternatively, only part of the solution discharged from the absorption tower may be passed through the oxidation tower, while the remainder of the solution is directly recycled to and mixed with the scrubbing solution entering the absorption tower for contact with the exhaust gas. After all or part of the aqueous solution, discharged from the absorption tower is passed through the oxidation tower, part of the alkali sulfate-containing aqueous solution exiting the oxidation tower may be directly returned to the absorption tower. It is preferable to pass through the oxidation tower only part of the solution which is discharged from the absorption tower, while directly recycling the remainder of the solution to the absorption tower. The optimum volumetric ratio for the portion of the aqueous solution to be diverted to the oxidation tower to that portion to be directly recycled to the absorption tower, depends on the quantity of sulfur dioxide in the exhaust gas and the quantity of the absorption solution in the absorption tower. Where a Fe-salt is used to accelerate the oxidation of the alkali sulfite as discussed hereinbefore, the Fe-salt will be present in the filtrate which is obtained after separation of the calcium sulfate. When such a filtrate is recycled to the absorption tower, 10% to 50% of the alkali sulfite produced in the absorption tower will be oxidized to sulfate by oxygen in the exhaust gas in the presence of the Fe-salt. Accordingly the quantity of the solution to be passed through the oxidation tower therefore may be somewhat reduced where a Fe-salt is present.

The method of the present invention will now be described in greater detail with reference to the accompanying drawing which shows by way of example, a preferred embodiment of the invention.

An exhaust gas 2 containing sulfur dioxide is introduced into a gas-absorption tower 1 for contact with an aqueous solution containing an alkali salt of an organic acid. Upon contact with the solution, sulfur dioxide is converted into alkali sulfite and dissolved in the solution. Part of the aqueous solution discharged from the absorption tower 1 is fed through a pipe 4 to an oxidation tower 5 while the remainder of the solution is recycled to an absorption tower 1 through another pipe 3 for recycling. Air is introduced at 10 into the oxidation tower 5 to oxidize the alkali sulfite in the aqueous solution to an alkali sulfate. Part of the alkali sulfate-containing aqueous solution exiting the oxidation tower 5 is returning through a pipe A to the scrubbing solution circulation loop of absorption tower 1. The remainder of the alkali sulfate-containing solution is fed through a pipe 6 for delivery to a gypsum formation vessel 7 where it is reacted with calcium carbonate or calcium hydroxide to form calcium sulfate. The calcium sulfate so formed is recovered after separation from the aqueous solution in a filter or gypsum separation means 8, while the filtrate is delivered to another vessel 11 for storage. The filtrate storage vessel 11 is connected through a pipe 9 to the absorption tower 1 to which the filtrate is returned to the scrubbing solution. Where all of the aqueous solution exiting the absorption tower 1 is fed to the oxidation tower 5, pipe 3 is unnecessary and pipe A may or may not be used. It is possible to further decrease the formation of scale or calcium sulfite deposits on the inner walls of the absorption tower 1 by substantially reducing calcium sulfate in the feed coming from the filtrate storage vessel 11 which otherwise contains the calcium sulfate in a quantity corresponding to the solubility of same. More particularly, the calcium sulfate concentration in the absorption tower 1 may be reduced by adding alkali sulfite to the filtrate from vessel 11 to change part or substantially all of the calcium sulfate into calcium sulfite for separation from the liquid by filtration, being returned to the tower 1 as a scrubbing solution. The alkali sulfite added to the filtrate in tank 11 may be the alkali sulfite-containing aqueous solution discharged from the absorption tower 1 or other alkali sulfite from an external source.

As will be understood from the foregoing description, the method according to the invention maintains the alkali sulfite concentration in the scrubbing solution, at a level of less than 1% to effectively prevent formation of scale on the inner walls of the reactor apparatus, while providing for the removal of sulfur dioxide from the exhaust gas in the form of calcium sulfate in an extremely efficient manner.

The method of the invention will be illustrated more particularly by the following examples, which are shown by way of illustration only and should not be construed as limiting the scope of the invention in any way. The following examples, including a comparative example, follow the steps as schematically shown in the accompanying drawing.

EXAMPLE 1

A glass cylinder of a 10 cm inside diameter and a 100 cm length, packed with ceramic Raschig rings of a 2.54 cm outside diameter and a 2.54 cm length, was used as the gas-absorption apparatus. The oxidation apparatus 5 was a glass cylinder of a 20 cm inside diameter and a 200 cm length having dispersion plates mounted in its lower portion. As the gas-absorption solution, an aqueous solution containing 10% sodium acetate, 1% sodium sulfite, 3.8% acetic acid, 7.1% sodium sulfate and 0.7% gypsum (as $CaSO_4$), maintained at a temperature of 55° C, was circulated through pipe 3 to the absorption tower 1 at a rate of 85 liters per hour.

A portion of the absorption liquid from the tower 1 was also fed through pipe 4 to the base portion of the oxidation tower 5 at a rate of 18 liters per hour while air was introduced at 10 at a temperature of 55° C, to the oxidation tower 5 at a rate of 6,000 liters per hour to oxidize sodium sulfite in the absorption solution. The oxidized solution which overflowed from the top of the oxidation tower 5 contained 10% sodium acetate, a trace of sodium sulfite, 3.8% acetic acid, 8.1% sodium sulfate and 0.1% gypsum.

Of the oxidized solution, 3 liters per hour was supplied to the pipe 6 while the remaining 15 liters per hour were returned via piping A and 3, to the circulating absorption solution. The filtrate, which was obtained after the separation and removal of gypsum, was fed through pipe 9 to the top portion of the gas-absorption tower 1 at a rate of 3 liters per hour. The filtrate was an aqueous solution containing 15% sodium acetate, 0.1% acetic acid, 4% sodium sulfate and 0.7% gypsum.

A gas containing 1,500 ppm sulfur dioxide, 5% oxygen and 10% carbon dioxide, which was moistened and heated to a temperature of 55° C was introduced through a bottom portion of the absorption tower 1 at a rate of 15,000 liters per hour. After 240 hours of continuous operation, no recognizable deposite of scale was noted anywhere on the inner walls of the absorption tower or the Raschig ring surfaces.

The absorption liquid leaving the bottom of absorption tower 1 during steady operation contained 10.1% sodium acetate, 0.8% sodium sulfite, 3.7% acetic acid, 7.2% sodium sulfate and 0.6% gypsum.

EXAMPLE 2

The procedure of Example 1 was repeated, with the exception that the quantity of aqueous solution passing through the oxidation tower was reduced to 9 liters per hour. As a result, the sodium sulfite concentration of the absorption solution exiting the absorption apparatus (through pipe 3) exceeded 1% after 190 hours of continuous operation. However, when the procedure of Example 1 was repeated using the same absorption solution, but having an extra 0.2% ferrous sulfate added, the sodium sulfite concentration of the solution exiting the absorption tower was less than 1% after 240 hours of continuous operation even when the portion of the solution, which was diverted to the oxidation tower, was reduced to 9 liters per hour.

These results show that the presence of ferrous salt in the absorption liquid enhances oxidation of alkali sulfite by oxygen in the exhaust gas to maintain a low concentration of alkali sulfite in the liquid within the absorption tower, thus contributing to the prevention of scale deposits.

COMPARATIVE EXAMPLE

The procedure of Example 1 was repeated with the same apparatus and the same solution with the exception that, in this case, air was not introduced into the oxidation tower. After 120 hours of the same continuous operation, a large quantity of white deposits were formed on the inner walls of the absorption tower and around the Raschig rings making continuous operation difficult.

The circulating solution was found to contain 10.8% sodium acetate, 3.5% sodium sulfite, 3.6% acetic acid, 4.1% sodium sulfate and 0.1% gypsum. The deposits or scale had a composition of approximately 40% calcium sulfite and 60% gypsum.

What is claimed is:

1. A method for removing sulfur dioxide from a sulfur dioxide-containing exhaust gas, comprising the steps of:
   1. contacting the exhaust with an aqueous scrubbing solution containing an alkali salt of an organic acid and less than 1% alkali sulfite to react the sulfur dioxide with said organic acid salt to form alkali sulfite in the solution;
   2. oxidizing at least a portion of the alkali sulfite solution to form an alkali sulfate solution;
   3. contacting said alkali sulfate-containing solution formed in step (2) with a calcium compound for reaction to convert alkali sulfate to calcium sulfate;
   4. filtering calcium sulfate from the solution formed in step (3); and
   5. recycling the filtrate from step (4) for use as the scrubbing solution in step (1).

2. The method of claim 1, wherein only a portion of the alkali sulfite-containing solution formed in step (1) is subjected to the oxidation step (2), and the remainder of said solution is recycled to form part of said scrubbing solution used in step (1).

3. The method of claim 1 wherein only a portion of the alkali sulfate-containing solution formed in step (2) is subjected to contact with calcium compound in step (3), and the remainder of the solution formed in step (2) is recycled to form part of the scrubbing solution used in step (1).

4. The method of claim 1, wherein said organic acid salt is an ammonium or alkali metal salt of formic acid, acetic acid, propionic acid or butyric acid.

5. The method of claim 1 additionally comprising, prior to the recycling of the filtrate from step (4), adding alkali sulfite to the filtrate to convert calcium sulfate contained therein into calcium sulfite and separating the calcium sulfite thus formed from solution.

* * * * *

UNITED STATES PATENT OFFICE
CERTIFICATE OF CORRECTION

Patent No. 3,987,149      Dated October 19, 1976

Inventor(s) Shigeru Saitoh et al

It is certified that error appears in the above-identified patent and that said Letters Patent are hereby corrected as shown below:

Column 2, line 18, after "the" (first occurrence) insert --organic--;

line 31, after "filtrate" insert --and--.

Column 5, line 34, delete "for recycling";

line 63, after "filtration," insert --the filtrate with a low calcium sulfate content thus obtained--.

Signed and Sealed this

Seventeenth Day of May 1977

[SEAL]

Attest:

RUTH C. MASON
*Attesting Officer*

C. MARSHALL DANN
*Commissioner of Patents and Trademarks*